US008761759B1

(12) United States Patent
Vargantwar et al.

(10) Patent No.: US 8,761,759 B1
(45) Date of Patent: Jun. 24, 2014

(54) USING MESSAGING TO CHANGE OPERATIONAL PARAMETERS ON A ROAMING MOBILE DEVICE

(75) Inventors: Sachin R. Vargantwar, Overland Park, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 369 days.

(21) Appl. No.: 12/767,060

(22) Filed: Apr. 26, 2010

(51) Int. Cl.
*H04W 4/00* (2009.01)

(52) U.S. Cl.
USPC ........ 455/432.1; 455/418; 455/419; 455/420; 455/432.3; 455/433; 455/436; 455/437; 455/438; 455/442; 455/466

(58) Field of Classification Search
USPC ........... 455/418–420, 432.1, 432.3, 433, 434, 455/436, 437, 438, 442, 466
See application file for complete search history.

(56) References Cited

U.S. PATENT DOCUMENTS

| 6,167,268 | A   | * | 12/2000 | Souissi et al. | 455/434   |
|-----------|-----|---|---------|----------------|-----------|
| 6,230,004 | B1  | * | 5/2001  | Hall et al.    | 455/414.2 |
| 2004/0030906 | A1 | * | 2/2004  | Marmigere et al. | 713/189 |
| 2004/0192254 | A1 | * | 9/2004  | Choi et al.    | 455/411   |
| 2006/0245392 | A1 | * | 11/2006 | Buckley et al. | 455/432.1 |
| 2008/0096527 | A1 | * | 4/2008  | Lamba et al.   | 455/411   |
| 2009/0156189 | A1 | * | 6/2009  | Ohman          | 455/418   |
| 2009/0253392 | A1 | * | 10/2009 | Colonna        | 455/161.3 |

* cited by examiner

*Primary Examiner* — Rafael Pérez-Gutiérrez
*Assistant Examiner* — Thai Vu

(57) ABSTRACT

A method and medium are provided for changing operational parameters on a mobile device while the mobile device is roaming. The mobile device supplies data that indicates operational characteristics of the mobile device to a home network by sending a first short-message service (SMS) message to the home network. The mobile device is connected to a roaming network and thus, the first message is sent using the messaging services of the roaming network. The home network determines new operational parameters for the mobile device based on the data. The home network sends a second SMS message to the mobile device which delivered to the mobile device by the roaming network's messaging services. The mobile device receives the second SMS message at a designated control slot and changes stored operational parameters to the new operational parameters.

18 Claims, 6 Drawing Sheets

USING MESSAGING TO CHANGE OPERATIONAL PARAMETERS ON A ROAMING MOBILE DEVICE

BACKGROUND

Mobile devices are generally associated with a home network that provides communication services thereto. When the mobile device leaves a service coverage area of the home network communication services may be provided by a foreign network based on service agreements made between the home and foreign networks.

While within the service coverage area of the home network, the home network may communicate directly with the mobile device via an overhead or control channel using for example the layer 3 network layer of the Open Systems Interconnection (OSI) software model. Through the overhead channel the home network can control functions of the mobile device for providing quality service, gathering data, and the like. At times, when the mobile device leaves the home network and establishes a connection with a foreign network, communications between the home network and the mobile device over the overhead channel are no longer available. As such, the home network cannot control functions or change operational parameters of the mobile device while the mobile device is not connected to the home network.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Aspects of the invention provide methods for changing an operational parameter on a mobile device that is connected to a roaming network. The mobile device collects operational data that might include radio frequency signal characteristics, the location of the mobile device, applications that are running on the mobile device, and a battery power status for the mobile device, among others. A message, such as a Short Message Service (SMS) message is composed by the mobile device and is sent to a home network to which the mobile device is subscribed to for service. Since the mobile device is connected to the roaming network, the message is sent to the home network through the roaming network's messaging systems. The home network receives the message and determines operational parameters for the mobile device based on the operational data included in the message. The home network sends a second message back to the mobile device, via the roaming network. The second message includes the operational parameters determined by the home network. The mobile device receives the message and sets operational parameters on the mobile device to those determined by the home network and included in the second message.

DESCRIPTION OF THE DRAWINGS

Illustrative embodiments of the invention are described in detail below with reference to the attached drawing figures, and wherein.

DETAILED DESCRIPTION

Figure 1:
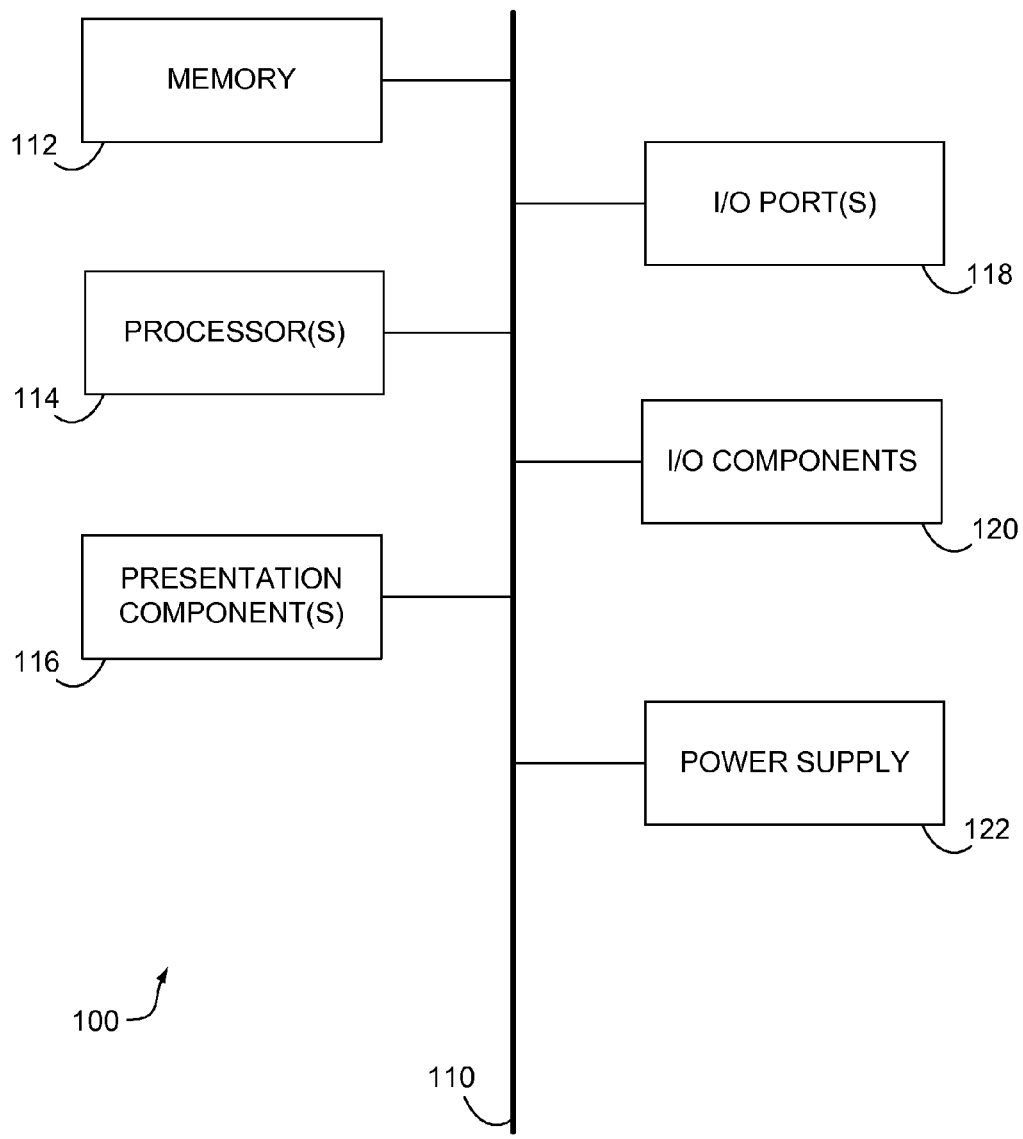
FIG. 1 is a block diagram depicting an exemplary computing device suitable for use in accordance with embodiments of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

MMS Multimedia Messaging Service
RF Radio Frequency
SMS Short Message Service
SMSC Short Message Service Center Further, various technical terms are used throughout this description. An illustrative resource that fleshes out various aspects of these terms can be found in Newton's Telecom Dictionary by H. Newton, 24th Edition (2008).

Embodiments of the invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random-access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention include computer-readable media and methods for changing operational parameters on a mobile device that is connected to a roaming network. In an embodiment, computer-readable media having computer-executable instructions embodied thereon that, when executed, perform a method to control roaming activities of a mobile device are descried. The method includes receiving at a computing device that has a processor and a memory and that resides on a first network, a first message that includes an indication of an operational characteristic for a mobile device. The mobile device is connected to a second network. The mobile device is subscribed to the first network and is not subscribed to the second network. A new operational parameter for the mobile device is determined. A second message to the mobile device that instructs the mobile device to change a stored operational parameter to the new operational parameter is composed. The second message is sent to the mobile device via the second network.

In another embodiment, a method on a mobile device having a processor and a memory is described. The mobile device connects to a second network. The mobile device is not subscribed to the second network. Operational data for the mobile device is collected. A first message to a first network is composed. The first message includes the operational data for the mobile device and the mobile device is subscribed to the first network. The first message is communicated to the first network via the second network. A second message is received from the first network via the second network that includes a new operational parameter.

In another embodiment, a method for communicating an operational parameter from a computing device on a home network to a mobile device that is connected to a roaming network is provided. A computing device on the home network receives a first short message service (SMS) message that includes an indication of an operational characteristic of a mobile device that is connected to a roaming network. The mobile device is subscribed to the home network and is not subscribed to the roaming network. A new operational parameter for the mobile device is determined. A second SMS message to the mobile device is composed that instructs the mobile device to change a stored operational parameter to the new operational parameter. The second SMS message is sent to the mobile device via the roaming network. As a result of receiving the second SMS message, the mobile device changes the stored operational parameter to the new operational parameter.

Referring initially to FIG. 1, an exemplary computing device 100 that is suitable for implementing embodiments of the invention is shown. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output ports 118, one or more input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device 100 that can be used in connection with one or more embodiments of the present invention. Distinction is not made between such categories as "workstation," "server," "laptop," "hand-held device," "mobile device," etc., as all are contemplated within the scope of FIG. 1 and reference to "computing device."

The memory 112 includes computer-storage media or computer-readable media, as described above. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc. The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
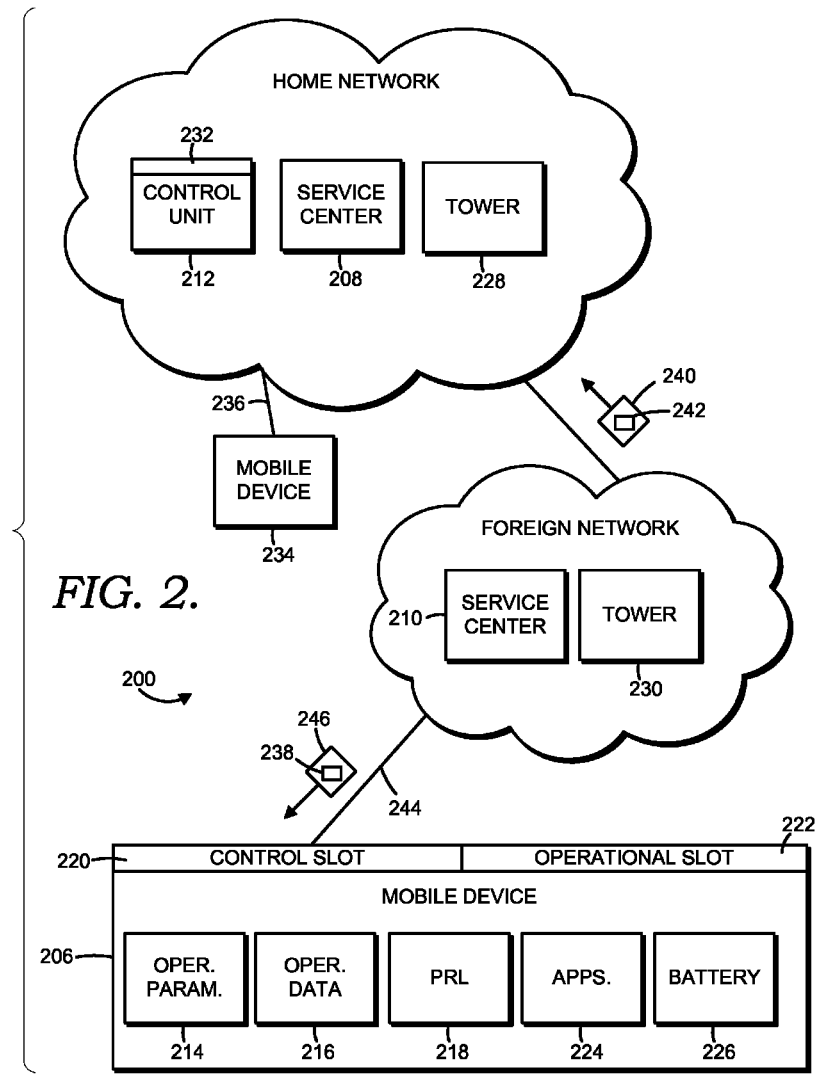
FIG. 2 is a block diagram depicting an exemplary network environment suitable for use in accordance with an embodiment of the invention.

Referring now to FIG. 2, a block diagram of an exemplary network environment suitable for use in implementing embodiments of the invention is generally designated as numeral 200. The network environment 200 depicted in FIG. 2 is only one exemplary environment, of which there may be many, suitable for implementing embodiments of the invention. Further, the components depicted in FIG. 2 are depicted singularly for clarity and are provided with names for reference, but one of ordinary skill in the art will recognize that a plurality of similar components may be used in application and that the nomenclature for the components may change without distracting from the functions described herein with respect to implementation of embodiments of the invention. For example, a network may have millions of mobile devices that it serves. Further, the nomenclature applied to a particular component on the environment 200 may change with respect to functions being performed thereby. The home network 202 and the foreign network 204 include various additional components necessary for implementing wireless communications such as, for example and not limitation, base stations, switches, routers, servers, and resource locators, among others, which are not shown in FIG. 2. Such is not intended to indicate the inclusion or exclusion of such components from the home network 202 or the foreign network 204. The depiction of FIG. 2 is presented in a simplified form for clarity in describing embodiments of the invention.

The environment 200 includes a home network 202 and a foreign network 204. The home network 202 and foreign network 204 are any wireless-telecommunications networks capable of receiving, processing, and delivering electronic messages such as for example, and not limitation, text messages, short message service (SMS) messages, multimedia messaging service (MMS) messages, and e-mail. Communications over the wireless network may be completed by any available standards or protocols including Global System for Mobile communications (GSM), Universal Mobile Telecommunications System (UMTS) Third Generation (3G), Personal Communications Service (PCS), or Ultra Mobile Broadband (UMB), among others. As used herein, the terms wireless-telecommunications network, telecommunications network, or simply, network are used interchangeably and are intended to illustrate any communications network suitable for communicating voice or data to one or more mobile devices. Such networks may include various wired and wireless components as is known in the art.

The home network 202 and foreign network 204, as described herein, are only differentiated to indicate that they are separate wireless-telecommunications networks and thus, serve separate subscribed client bases, but may also serve non-subscribed mobile devices that are roaming. As such, the home network 202 provides wireless-communications service to a mobile device 206 when the mobile device is within a service area of the home network 202. The foreign network 204 also provides service to the mobile device 206 when the mobile device 206 is within a service area of the foreign network 204 and is not being served by the home network 202.

The mobile device 206 is any available mobile device capable of sending and receiving messages, such as text messages. The mobile device 206 includes, for example and not limitation, any wireless phone, cellular phone, personal digital assistant (PDA), BlackBerry® device, wireless enabled media player, or other device configured to communicate over a wireless network. Such communication may be voice, data, image, video, or other type of data and may utilize services and protocols to enable short message service (SMS), text messaging, email, packet switching for Internet access, and multimedia messaging service (MMS), among others.

Short message service (SMS) is a widely used communications protocol for exchanging messages, often referred to as text messages, between two or more electronic devices. Typically, the devices are wireless mobile devices, such as mobile device 206, and are configured to generate and receive SMS messages. SMS messages are short strings of text that allow users to communicate. The text strings may be limited to a maximum of 160 7-bit text characters, or less per SMS message.

Multimedia messaging service (MMS) is a telecommunications standard for sending and receiving messages that may include text, rich text, images, audio, video, or other data. MMS may utilize Third Generation Partnership Project (3GPP) and wireless application protocol (WAP) standards as well as general packet radio service (GPRS), among other wireless-network technologies to communicate multimedia messages to a recipient mobile device. Other forms of messages, such as an e-mail, may be composed and sent from computing devices, such as a personal computer, and then communicated to a recipient mobile device as an MMS message.

In an embodiment, the mobile device 206 includes a control slot 220 or a "slot 0" to which messages or other communications can be addressed for controlling and communicating with background functions of the mobile device 206. Communications addressed to the control slot 220 are unbilled network communications. In contrast, communications addressed to an operational slot 222 or a "slot 1" are billed communications such as messaging activities of a user of the mobile device 206. In an embodiment, the control slot 220 and the operational slot 222 are referred to as user profiles.

The mobile device 206 is also configured to gather operational data 216. Operational data 216 includes any indication of the operational characteristics of the mobile device 206 or the network environment 200 conditions experienced by the mobile device 206. For example, operational data 216 include radio frequency (RF) signal conditions, a location of the mobile device, applications being executed by the mobile device, and a battery 226 power status of the mobile device 206, among a variety of others. The RF signal conditions might include a listing of towers 228 on the home network 202, towers 230 on the foreign network 204, or any other particular towers, antennas, or RF transceivers (hereinafter generally referred to as towers 228, 230) from which the mobile device 206 can detect an RF signal. The RF signal conditions may also include a listing of channels on which the mobile device 206 detects an RF signal as well as a measure of the signal strength, the signal-to-noise ratio, or signal quality, among others. The RF conditions might also indicate a number of lost frames or a voice quality rating for previous communications between the mobile device 206 and one or more of the towers 228, 230. The location of the mobile device can be determined by the mobile device 206 via a global position system (GPS) or based on the towers that the mobile device 206 detects, among other methods.

Throughout this discussion the mobile device 206 is referred to as subscribed to the home network 202. Such a description is intended to indicate that wireless-telecommunications services are provided to the mobile device by the home network 202. The mobile device 206 may have a subscription agreement with the home network 202, but such is not necessary. Various subscription agreements and service contract options are available in the art, such as for example, annual contracts, pay-per-minute plans, and pre-paid accounts, among others. Any such agreement, contract, or service plan is suitable for use in embodiments of the invention. The foreign network 204 is any wireless-telecommunications network or carrier that is not the home network 202.

Roaming occurs when a user subscribed to the home network 202 connects to a network other than the home network 202, such as the foreign network 204. A mobile device 206, having a subscription to a home network may roam when, for example, and not limitation, the mobile device 206 cannot find a home-network signal, a home-network signal is weak or intermittent, or the mobile device 206 does not properly search for a home-network signal. A home-network signal might be weak or not found even within a service area of a home-network tower 228 where for example, a structure, building, or feature of the landscape blocks the signal. Additionally, other signals or energies may interfere with the signal, or the number of connections being serviced by a tower 228 may decrease the size of an tower's service area, among others.

Referring again to FIG. 2, the environment 200 also includes a service center 208 on the home network 202 and a service center 210 on the foreign network 204. The service centers 208, 210 include one or more computing devices, such as the computing device 100 that are used by the home and foreign networks 202, 204 to receive, process, and deliver messages, such as for example text messages, SMS message, e-mail, or MMS messages, from the mobile device 206 to the home network 202 and vice versa. The service centers 208, 210 can be short message service centers (SMSC), multimedia messaging service centers (MMSC), or the like.

A control unit 212 is included in the home network 202. The control unit 212 includes one or more computing devices, such as the computing device 100. The control unit 212 is configured to communicate with the mobile device 206 via messaging when the mobile device 206 is connected to the foreign network 204, as described more fully below. The control unit 212 includes one or more overhead or control addresses 232 to which the mobile device 206 can address such messages. The control address 232 may be a profile address, an internet protocol (IP) address, a control port address, or any other address useable by the mobile device 206 for addressing messages to the control unit 212. The control address 232 is also useable by the control unit 212 and the home network 212 to differentiate overhead messages from billed user activity messages. Additionally, the control unit 212 is configured to receive operational data 216 that is included in a message from the mobile device 206 and to determine new operational parameters 238 to be set on the mobile device 206, as described below. In an embodiment, the control unit 212 also communicates with mobile devices 234 that are connected to the home network 202 via a control channel 236 using layer 3 network layer communication protocols.

Operational parameters 214 and new operational parameters 238 include any parameters, settings, values, rules, algorithms, programs, logic, and the like that control the operation of the mobile device 206 in establishing and identifying a connection to the home network 202 or the foreign network 204. For example, the operational parameters 214, 238 can include a rescan timer setting that indicates when and/or how often the mobile device 206 is to scan for available RF signals from the home network 202, an indication of channels to be scanned by the mobile device 206 when completing such a rescan, and a prioritization of such channels. The operational parameters might also indicate when the mobile device 206 is to rescan for a home network 202 signal based on location of the device, time of day, a battery 226 status, or based on an application 224 being executed by the mobile device 206, among a variety of others.

Applications 224 include software, programs, or other logic that is executed by the mobile device 206 to perform one or more functions. For example, and not limitation, an application 224 can include an email program, a television or video streaming program, games, file creation and transfer programs, messaging programs, and the like. Execution or performance of an application 224 by the mobile device 206 may require communication with one or more other computing devices connected to the home or foreign networks 202, 204 for downloading or transferring files and data.

Figure 3:
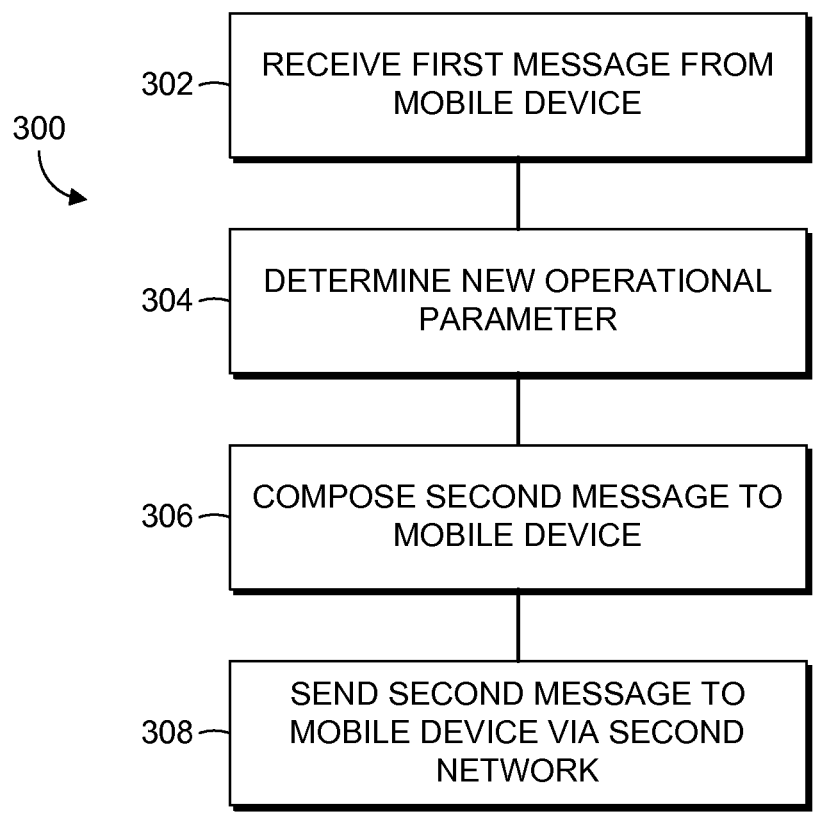
FIG. 3 is a flow diagram depicting a method to control roaming activities of a mobile device in accordance with an embodiment of the invention.

With additional reference now to FIG. 3, a method 300 to control roaming activities of a mobile device 206 in accordance with an embodiment of the invention is described. Initially, the mobile device 206 acquires a connection 244 with the foreign network 204 as is known in the art. A message 240 is received from the mobile device 206 by the control unit 212 on the home network 202, as indicated at a step 302. The message 240 is a text message, an SMS message, an MMS message, an email, or any other available electronic message. The message 240 is described hereinafter as an SMS text message so as not to confound the description of embodiments of the invention provided herein however, such is not intended to limit the message 240 to SMS messages only or to limit the communication and delivery of the message 240 to the processes employed for SMS messaging as described herein.

The message 240 includes an indication 242 of one or more operational data 216 that describe operational characteristics of the roaming mobile device 206. The operational characteristics include RF signal conditions, a location of the mobile device 206, applications 224 being executed by the mobile device 206, and a battery 226 power status, among others as described above.

The message 240 is composed by the mobile device 206 following standard messaging protocols used for user-initiated messaging (e.g., billed messaging or messages that are created or received by a user of the mobile device 206) and is addressed to the control address 232 of the control unit 212.

Because the mobile device 206 is roaming and is connected to the foreign network 204, communications with the home network 202 through the control channel 236 or layer 3 communications is not available. As such, the message 240 is then sent by the mobile device 206 using the connection 244 with the foreign network 206 and the messaging services provided by the service center 210 of the foreign network 204 in the same manner as a user-initiated message. The service center 210 handles and delivers the message 240 similarly to all other SMS messages. In an embodiment, the message 240 is not recognized by the service center 210 or the foreign network 204 as having any differences from other SMS messages delivered thereby. The service center 210 receives the message 240 from the mobile device 206 and forwards the message 240 either directly to the control unit 212 or to the service center 208 on the home network 202 for further delivery to the control unit 212.

Where the message 240 is delivered to the service center 208, the service center 208 further delivers the message 240 the control unit 212. The service center 208 delivers the message in the same manner as any other message would be delivered however, the message is delivered to the control address 232 of the control unit 212 rather than to a recipient mobile device, such as the mobile device 234.

At a step 304, the control unit 212 analyzes the indications 242 of the operational data 216 for the mobile device 206 that are included in the message to determine one or more new operational parameters 238 for the mobile device 206. The new operational parameters 238 include one or more of a changed rescan timer setting, a listing of towers 228, 230 or channels to scan for available service, or a prioritization of such a listing, among others.

The control unit 212 uses any desired algorithms, programs, or other logic to determine the new operational parameters 238. The control unit 212 may also employ a lookup in a chart, table, hash, or database to identify the new operational parameters 238. The new operational parameters 238 are determined to increase the quality of service provided to the mobile device 206 or may be determined to decrease the mobile device's 206 roaming or decrease the battery 226 consumption of the mobile device, among others.

For example, based on the operational data indications 242 provided in the message 240, the control unit 212 might determine that the rescan timer should be set to a longer time period between rescans because the mobile device 206 is in an area where the home network 202 has little or no service coverage. The control unit 212 might also determine that the rescan timer should be set to a longer period of time because the mobile device 206 is executing an application 224 that requires a strong connection for communicating large amounts of data and the foreign network 204 is better able to provide such a connection to the mobile device 206 at its present location.

In either of the above situations the control unit 212 may determine that the quality of service provided to the mobile device 206 is increased by keeping the mobile device 206 connected to the foreign network 204 and thus, lengthening the time between rescans for available home network 202 signals will keep the mobile device 206 connected to the foreign network 204 for a longer period of time. Such may avoid situations where the mobile device 206 alternates between a weak signal from the home network 202 and a stronger signal from the foreign network 204 causing dropped calls or data loss and resulting in poor quality of service.

In another exemplary situation, the control unit 212 determines that the mobile device 206 has very little battery power remaining. As such, the control unit 212 can determine that the rescan timer setting should be lengthened to reduce the number of times the mobile device 206 executes a rescan and thus, consumes additional battery power. Additionally, or alternatively, the control unit 212 might identify a truncated and/or prioritized listing of channels that the mobile device 206 is to scan for signals. Thus, the mobile device 206 can conserve power in the battery 226 by scanning fewer channels.

With continued reference to FIG. 3, the control unit 212 composes a message 246 to the mobile device 206 that includes the new operational parameters 238 determined by the control unit 212, as indicated at a step 306. Like the message 240, the message 246 uses any available electronic messaging form such as text, SMS, MMS, or email, among other and is described hereinafter as an SMS text message for sake of clarity. However, the message 246 is not limited to SMS text messages or to the communication mechanisms for SMS messages as described herein.

The message 246 is addressed to a control slot 220 of the mobile device 206. The message 246 may also include one or more commands or instructions to the mobile device 206 instructing the mobile device 206 to change or set stored operational parameters 214 on the mobile device 206 to the new operational parameters 238 contained in the message 246. In an embodiment, changing the stored operational parameters 214 to the new operational parameters 238 includes, for example, changing a stored parameter value to a new value, adding a new parameter, or deleting a parameter. In an embodiment, the new operational parameters 238 include one or more duplicate parameters that are the same as one or more operational parameters 214 stored on the mobile device 206. As such, the duplicate parameters are discarded or the stored operational parameters 214 are overwritten with the duplicate parameters. The message may also include any desired authentication, security, or other information.

At a step 308, the message 246 is sent by the control unit 212 to the mobile device 206. As described previously, the message 246 is processed, routed, and delivered by the service center 208 and the home network 202 as well as the service center 210 and the foreign network 204 just as any other SMS message is handled.

Upon receipt of the message 246, the mobile device 206 identifies the message 246 as a control message based at least on the receipt of the message 246 at the control slot 220. The new operational parameters 238 are read from the message 246 and one or more stored operational parameters 214 are changed or set to the new operational parameters 238. In an embodiment, the mobile device 206 does not include a stored operational parameter 214 that can be changed to the new operational parameter 238. Thus, the new operational parameter 238 is added to the operational parameters 214 stored on the device 206. Alternatively, the message 246 includes a command to delete a stored operational parameter 214 from the memory of the mobile device 206. In another embodiment, the mobile device 206 also authenticates, decrypts, and provides any other desired security functions in regard to the message 246. Accordingly, the operational parameters 214 stored on the mobile device 206 are changed by the control unit 212 of the home network 202 while the mobile device 206 is connected to the foreign network 204.

Figure 4:
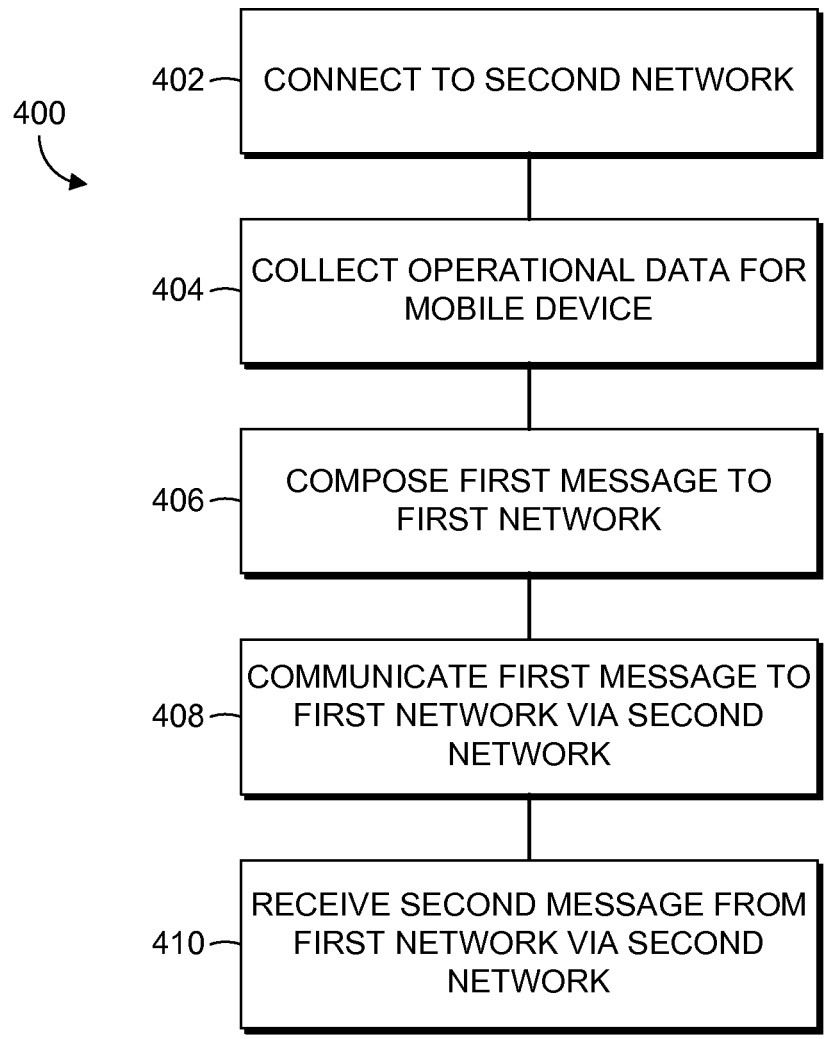
FIG. 4 is a flow diagram depicting a method for receiving operational parameters at a mobile device in accordance with an embodiment of the invention.

Referring now to FIG. 4, a method 400 for receiving new operational parameters 238 at a mobile device 206 in accordance with an embodiment of the invention is described. At a step 402, the mobile device 206 connects to the foreign network 204 such as by the connection 244. The connection process between the mobile device 206 and the foreign network 204 is completed by any protocols or procedures known in the art.

During the establishment of the connection 244 a component of the foreign network 204 may contact the systems of the home network 202, such as a home location registry (HLR) (not shown) to authenticate the mobile device 206 as being subscribed to and in good standing with the home network 202. Such communication may be used by the home network 202 as an indication that the mobile device 206 is roaming. In an embodiment, identifying the mobile device 206 as roaming in this manner results in the control unit 212 sending a message to the mobile device 206 to instruct the mobile device 206 to collect operational data and to send the operational data to the control unit 212. Alternatively, the mobile device 206 can determine that it is roaming based on a preferred roaming list (PRL) 218 that is stored on the mobile device 206 and that indicates home network towers 228 and foreign network towers 230 as such, among other methods. Accordingly, the mobile device 206 can collect operational data 216 on its own initiative without a command or query from the home network 202.

At a step 404, the mobile device 206 collects the operational data 216 as describe previously above. The mobile device 206 composes a message 240 that is addressed to the control address 232 of the control unit 212 and that includes indications 242 of the operational data 216, as indicated at a step 406. At a step 408, the mobile device 206 sends the message 240 to the control unit 212 on the home network 202 using the messaging services of the service center 210 on the foreign network 204. The service center 210 delivers the message 240 to the home network 202 just as it would any other message sent by a mobile device connected to the foreign network 204.

At a step 410, the mobile device 206 receives a message 246 from the home network 202 via the messaging services of the service center 210. The message 246 includes one or more new operational parameters 238 that are to be set on the mobile device 206. The mobile device 206 reads the new operational parameters 238 and changes stored operational parameters 214 to the new operational parameters 238.

Figure 5:
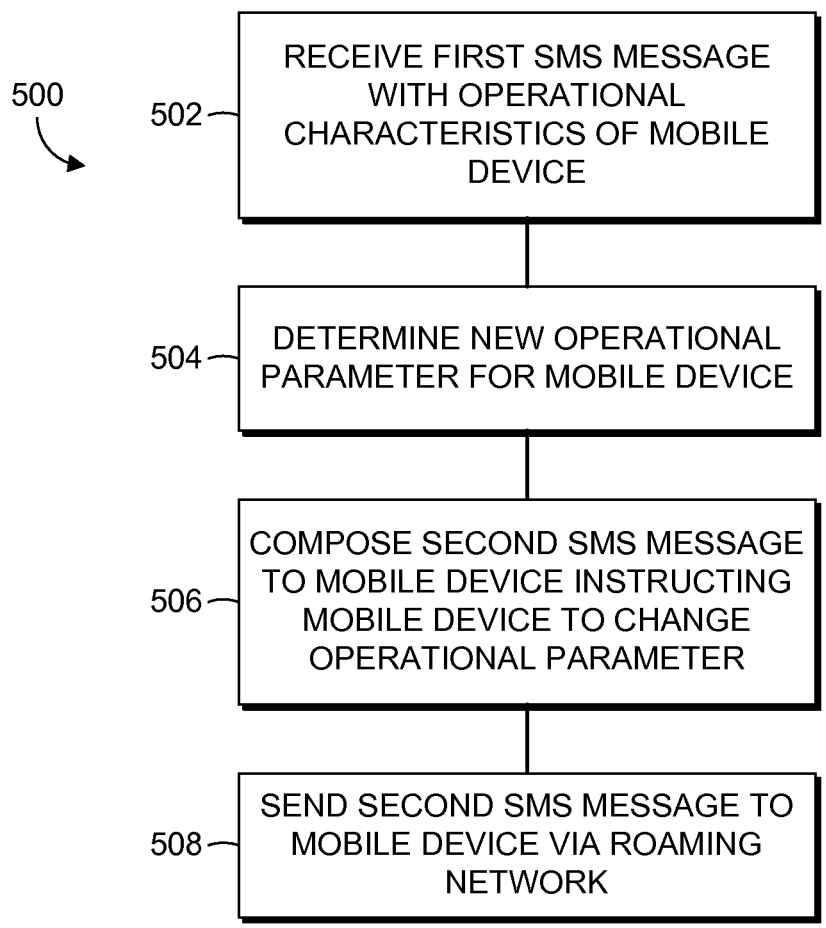
FIG. 5 is a flow diagram depicting a method for communicating an operational parameter from a computing device on a home network to a mobile device that is connected to a roaming network in accordance with an embodiment of the invention.

With reference to FIG. 5, a method 500 for communicating a new operational parameter 238 from a computing device, such as the control unit 212, on the home network 202 to the mobile device 206 that is connected to the foreign network 204 in accordance with an embodiment of the invention is described. At a step 502, an SMS message 240 that includes one or more operational data elements, such as the indications 242, is received by the home network 202 at the control unit 212 from the mobile device 206. In an embodiment, the mobile device 206 sends the SMS message 240 to the control unit 212 as a result of a command or query from the control unit 212. In another embodiment, the mobile device 206 automatically sends the SMS message 240 to the control unit 212 when the mobile device 206 determines that it is connected to a foreign network 204. In yet another embodiment, the mobile device 206 automatically sends the SMS message 240 when the location of the mobile device 206 is changed beyond a determined radius or other geographic boundary, when the user of the mobile device initiates an application 224 that employs a relatively large amount of data transfer or bandwidth, when the mobile device 206 connects to a second foreign network (not shown), or at a predetermined time or time interval.

Based on the received operational data elements for the mobile device 206, the control unit 212 determines one or more new operational parameters 238 for the mobile device 206, as indicated at a step 504. The control unit 212 composes a second SMS message 246 addressed to the control slot 220 of the mobile device 206 that includes the one or more new operational parameters 238, as indicated at a step 506. At a step 508, the second SMS message 246 is sent by the control unit 212 to the mobile device 206 via the service center 210 of the foreign network 204. The mobile device 206 can then implement the new operational parameters 238 included in the SMS message 246 to control one or more operational functions of the mobile device 206.

Figure 6:
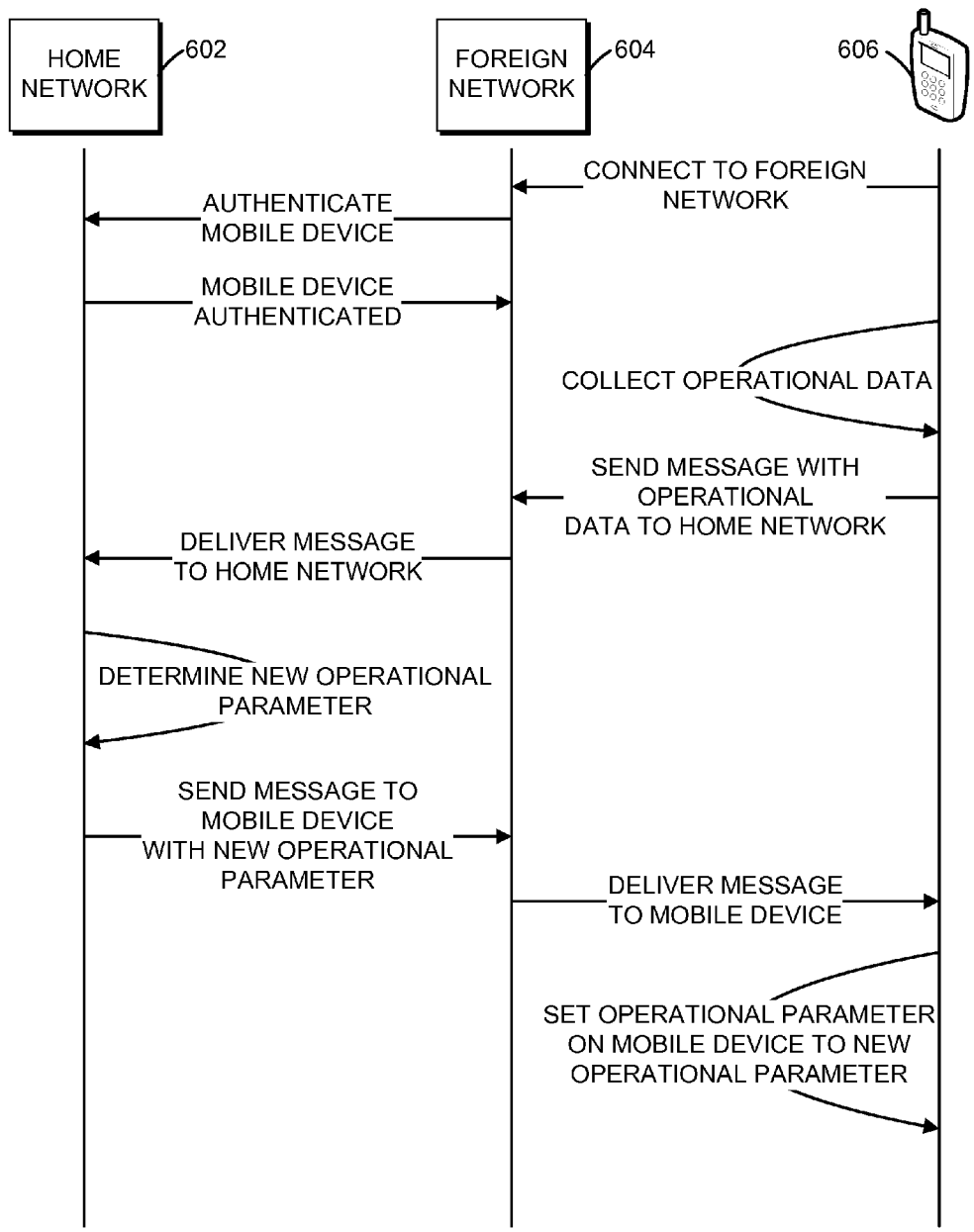
FIG. 6 is a flow diagram depicting the communication of operational parameters to a mobile device connected to a foreign network in accordance with an embodiment of the invention.

With additional reference now to FIG. 6, a flow diagram depicting the communication of operational parameters to a mobile device 206 connected to a foreign network 604 in accordance with an embodiment of the invention is described. Initially, the mobile device 606 establishes a connection with the foreign network 604. The foreign network 604 authenticates the mobile device 606 as a valid subscriber to a home network 602 by communicating with the home network's systems. The mobile device 606 collects one or more operational data elements at any time prior to, during, or after establishing the connection with the foreign network.

Upon establishing the connection with the foreign network 604, the mobile device 606 sends a message, such as an SMS message, that includes one or more of the collected operational data elements to the home network 602. The message is sent through the connection with the foreign network 604 and is delivered by the foreign network 604 to the home network 602.

The home network 602 determines one or more new operational parameters for the mobile device 606 based on the one or more operational data elements included in the message received from the mobile device 606. In an embodiment, the home network 602 utilizes one or more other data elements in addition to the operational data elements included in the message to determine the new operational parameters. The home network 602 generates a second message that includes the new operational parameters and that is addressed to a control slot of the mobile device 606.

The second message is sent to the mobile device 606 through the foreign network 604 and is delivered to the mobile device 606 by the foreign network 604. The mobile device 606 then sets one or more operational parameters stored on the mobile device 606 to the new operational parameters communicated in the second message.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. One or more non-transitory computer-readable media having computer-executable instructions embodied thereon that, when executed, perform a method to control roaming activities of a mobile device, the method comprising:
   receiving at a computing device that has a processor and a memory and that resides on a first network, a first message that comprises an operational characteristic that is used to determine a rescan timer setting for the mobile device, the mobile device being connected to a second network, the mobile device is in communication with the first network via the second network to receive the rescan timer setting for the mobile device from the first network, wherein the mobile device is subscribed to the first network and is not subscribed to the second network, and wherein the rescan timer setting indicates the frequency at which the mobile device scans for a network signal;
   determining at the computing device the rescan timer setting for the mobile device based on operational characteristic for the mobile device;
   composing at the computing device a second message to the mobile device that instructs the mobile device to change a stored rescan timer setting to the new rescan timer setting; and
   sending the second message to the mobile device via the second network, wherein the mobile device comprises a control slot configured for receiving messages addressed to the control slot that are unbilled network communications and an operational slot configured for receiving messages addressed to the operation slot that are billed networked communications, and wherein the second message is an unbilled network communication addressed to the control slot of the mobile device;
   wherein the first message is addressed to a control address of the first network, wherein the control address is used to distinguish control messages from billed user activity messages.

2. The media of claim 1, further comprising:
   receiving an indication that a mobile device is connected to the second network.

3. The media of claim 1, wherein as a result of receiving the second message, the mobile device sets the stored rescan timer setting to the new rescan timer setting.

4. The media of claim 1, wherein the first and second messages are one or more of a text message, a short message service message, an e-mail, and a multimedia messaging service message.

5. The media of claim 1, wherein the operational characteristic of the mobile device includes one or more of radio frequency signal conditions, a location of the mobile device, applications being executed by the mobile device, and a battery power status of the mobile device.

6. The media of claim 1, wherein the rescan timer setting further comprises one or more of an indication of one or more channels to scan, and an order in which to scan one or more channels.

7. The media of claim 1, wherein determining rescan timer setting for the mobile device further comprises:
   determining a rate at which the mobile device is to scan for available signals based on one or more of radio frequency signal conditions, the location of the mobile device, an application running on the mobile device, and a battery power status of the mobile device.

8. The media of claim 7, wherein the rate at which the mobile device is to scan for available signals is determined to optimize quality of service.

9. The media of claim 7, wherein the rate at which the mobile device is to scan for available signals is determined to reduce consumption of the mobile device battery power.

10. The media of claim 1, wherein a user of the mobile device is unaware of the messaging between the mobile device and the first network.

11. A method on a mobile device having a processor and a memory, the method comprising:
connecting to a second network, wherein the mobile device is not subscribed to the second network;
collecting operational data for the mobile device;
composing a first message to a first network, the first message including the operational data for the mobile device, wherein the mobile device is subscribed to the first network, and wherein the mobile device is in communication with the first network via the second network to receive a new operational parameter for the mobile device from the first network,
communicating the first message to the first network via the second network; and
receiving at a control slot in the mobile device a second message addressed to the control slot from the first network via the second network that includes the new operational parameter based on the operational data for the mobile device, wherein the new operational parameter comprises a rescan timer setting for a network signal of the mobile device, and wherein the control slot is configured to receive the second message that includes the new operational parameter, the second message is an unbilled network communication addressed to the control slot of the mobile device from the first network via the second network;
wherein the first message is addressed to be received directly at the control address of the first network, the control address is used to distinguish control messages from billed user activity messages.

12. The method of claim 11, further comprising:
changing a stored operational parameter on the mobile device to the new operational parameter received from the first network in the second message, wherein the stored operational parameter comprises a rescan timer setting for a network signal of the mobile device.

13. The method of claim 11, wherein the first and second messages are one or more of a text message and a short messages service (SMS) message.

14. The method of claim 13, wherein the second network handles the first and second messages in the same manner as other messages that it receives from a sender and delivers to a recipient.

15. The method of claim 11, wherein the operational data of the mobile device includes one or more of radio frequency signal conditions, a location of the mobile device, applications being executed by the mobile device, and a battery power status of the mobile device.

16. The method of claim 11, wherein the operational parameter further comprises one or more of an indication of one or more channels to scan, and an order in which to scan one or more channels.

17. A method for communicating an operational parameter from a computing device on a home network to a mobile device that is connected to a roaming network, the method comprising:
receiving at a control unit of the computing device on the home network, a first short message service (SMS) message that includes an indication of an operational characteristic of the mobile device that is connected to the roaming network, wherein the mobile device is subscribed to the home network and is not subscribed to the roaming network, the mobile device is in communication with the home network via the roaming network to receive a new operational parameter for the mobile device from the home network, and wherein the control unit includes a control address configured to receive the first SMS message that includes an indication of an operational characteristic, the first SMS message is an unbilled network communication addressed to the control address of the control unit;
determining a new operational parameter for the mobile device, wherein the new operational parameter comprises a rescan timer setting for a network signal of the mobile device;
composing a second SMS message to the mobile device that instructs the mobile device to change a stored operational parameter to the new operational parameter, wherein the stored operational parameter comprises a rescan timer setting for a network signal of the mobile device; and
sending the second SMS message to a control slot of the mobile device via the roaming network, wherein as a result the mobile device changes the stored operational parameter to the new operational parameter; and wherein the control slot is configured to receive the second SMS message that instructs the mobile device to change the stored operational parameter to the new operational parameter, the second SMS message is an unbilled network communication addressed to the control slot of the mobile device of receiving the second SMS message;
wherein the first SMS message is addressed to be received directly at the control address of the first network, the control address is used to distinguish control messages from billed user activity messages.

18. The method of claim 17, wherein the new operational parameter and the stored operational parameter further comprise one or more of, an indication of one or more channels to scan, and an order in which to scan one or more channels.

* * * * *